(12) United States Patent
Marcolino et al.

(10) Patent No.: US 9,665,604 B2
(45) Date of Patent: May 30, 2017

(54) MODELING AND MANIPULATION OF SEISMIC REFERENCE DATUM (SRD) IN A COLLABORATIVE PETRO-TECHNICAL APPLICATION ENVIRONMENT

(71) Applicant: Schlumberger Technology Corporation, Sugar Land, TX (US)

(72) Inventors: Cristiano da Silva Marcolino, Ipanema (BR); Raj Kannan, Houston, TX (US); Dominic Suen, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 131 days.

(21) Appl. No.: 13/955,566

(22) Filed: Jul. 31, 2013

(65) Prior Publication Data
US 2014/0040324 A1 Feb. 6, 2014

Related U.S. Application Data

(60) Provisional application No. 61/677,889, filed on Jul. 31, 2012.

(51) Int. Cl.
*G06F 7/00* (2006.01)
*G06F 17/30* (2006.01)
*G06Q 10/06* (2012.01)

(52) U.S. Cl.
CPC ... *G06F 17/30312* (2013.01); *G06Q 10/0631* (2013.01)

(58) Field of Classification Search
CPC .. H03H 7/40; H02J 5/005; H02J 17/00; B60L 2200/26; B60L 11/82
See application file for complete search history.

(56) References Cited

U.S. PATENT DOCUMENTS

| | | | | |
|---|---|---|---|---|
| 6,152,246 | A * | 11/2000 | King et al. | 175/26 |
| 7,051,808 | B1 * | 5/2006 | Vinegar | B09C 1/02 166/250.01 |
| 7,599,943 | B2 * | 10/2009 | Erb et al. | |
| 7,663,972 | B2 * | 2/2010 | Martinez et al. | 367/52 |
| 7,946,356 | B2 * | 5/2011 | Koederitz et al. | 175/40 |
| 8,078,406 | B2 * | 12/2011 | Kristiansen et al. | 702/14 |
| 8,103,453 | B2 * | 1/2012 | Abma | 702/16 |
| 8,159,365 | B2 * | 4/2012 | Milne | 340/853.1 |
| 8,170,800 | B2 * | 5/2012 | Aamodt et al. | 702/9 |
| 8,204,692 | B2 * | 6/2012 | Arango et al. | 702/9 |
| 8,210,283 | B1 * | 7/2012 | Benson et al. | 175/61 |
| 8,249,994 | B2 * | 8/2012 | Sinclair et al. | 705/313 |
| 2004/0103376 | A1 * | 5/2004 | Pandey | E21B 41/00 715/211 |
| 2004/0215396 | A1 * | 10/2004 | Christie et al. | 702/14 |

(Continued)

*Primary Examiner* — Hosain Alam
*Assistant Examiner* — Nicholas Allen
(74) *Attorney, Agent, or Firm* — Colin Wier

(57) ABSTRACT

A method, apparatus, and program product facilitate the management of time domain data in a collaborative petro-technical application environment by associating time domain data in a shared project or repository with a data-specific SRD value. By doing so, when the time domain data is retrieved into a local project or client application for a particular user, the SRD for the time domain data and the SRD for the local project or client application may be used to facilitate conversion of the time domain data for use with the SRD for the local project or client application.

17 Claims, 6 Drawing Sheets

(56) References Cited

U.S. PATENT DOCUMENTS

| | | | |
|---|---|---|---|
| 2005/0041527 A1* | 2/2005 | Al-Ali | 367/38 |
| 2005/0276162 A1* | 12/2005 | Brinkmann | G01V 1/24 367/77 |
| 2007/0299643 A1* | 12/2007 | Guyaguler | G01V 11/00 703/10 |
| 2008/0059002 A1* | 3/2008 | Hartkamp et al. | 700/299 |
| 2008/0059175 A1* | 3/2008 | Miyajima | G10L 15/25 704/246 |
| 2008/0079723 A1* | 4/2008 | Hanson | G06K 9/0063 345/427 |
| 2008/0208475 A1* | 8/2008 | Karr et al. | 702/6 |
| 2009/0026510 A1* | 1/2009 | Lim | 257/292 |
| 2009/0055477 A1* | 2/2009 | Flesher et al. | 709/204 |
| 2009/0058674 A1* | 3/2009 | Papouras et al. | 340/853.2 |
| 2009/0126939 A1* | 5/2009 | Lu et al. | 166/369 |
| 2009/0157590 A1* | 6/2009 | Mijares et al. | 706/61 |
| 2009/0265110 A1* | 10/2009 | Narayanan et al. | 702/6 |
| 2010/0074053 A1* | 3/2010 | Jaiswal | G01V 1/303 367/73 |
| 2010/0076714 A1* | 3/2010 | Discenzo | 702/104 |
| 2010/0114495 A1* | 5/2010 | Al-Saleh | G01V 1/364 702/17 |
| 2010/0179963 A1* | 7/2010 | Conner | G01C 21/32 707/769 |
| 2010/0182873 A1* | 7/2010 | Kluver | G01V 1/36 367/21 |
| 2010/0191516 A1* | 7/2010 | Benish et al. | 703/10 |
| 2010/0212909 A1* | 8/2010 | Baumstein et al. | 166/369 |
| 2011/0103187 A1* | 5/2011 | Albertin et al. | 367/73 |
| 2011/0110190 A1* | 5/2011 | Thomson | G01V 1/303 367/38 |
| 2011/0288831 A1* | 11/2011 | Tan et al. | 703/2 |
| 2011/0305109 A1* | 12/2011 | Soubaras | G01V 1/28 367/24 |
| 2012/0029827 A1* | 2/2012 | Pepper et al. | 702/16 |
| 2012/0041695 A1* | 2/2012 | Baldwin | 702/56 |
| 2012/0054270 A1* | 3/2012 | Foreman et al. | 709/203 |
| 2012/0072188 A1* | 3/2012 | Maerten | G01V 99/005 703/2 |
| 2012/0113750 A1* | 5/2012 | Al-Momin et al. | 367/38 |
| 2012/0155218 A1* | 6/2012 | Beasley | G01V 1/364 367/46 |
| 2012/0163121 A1* | 6/2012 | Hardage | G01V 1/286 367/21 |
| 2014/0157172 A1* | 6/2014 | Peery et al. | 715/771 |

\* cited by examiner

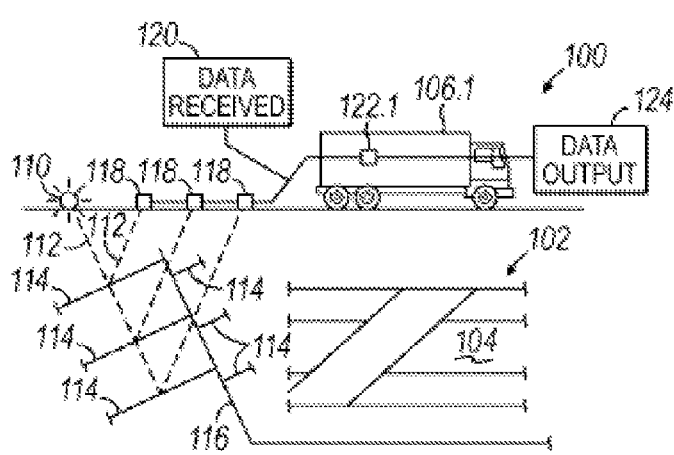
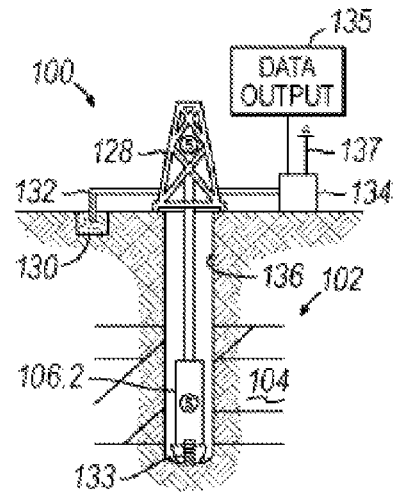
FIG. 2A  FIG. 2B
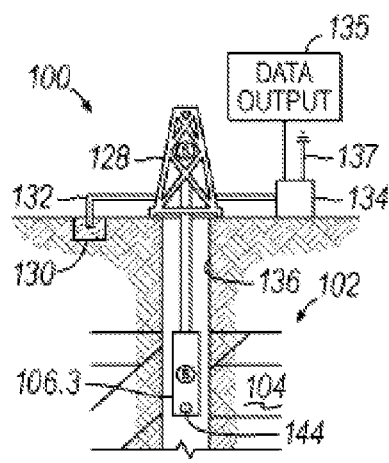
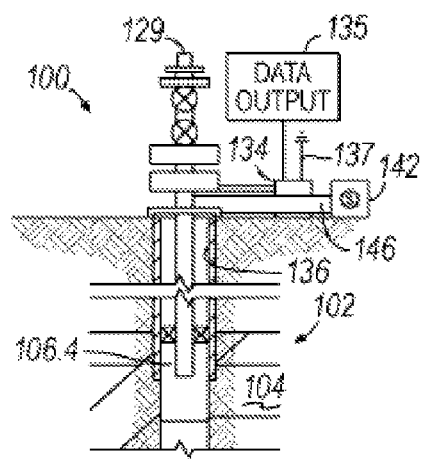
FIG. 2C  FIG. 2D

MODELING AND MANIPULATION OF SEISMIC REFERENCE DATUM (SRD) IN A COLLABORATIVE PETRO-TECHNICAL APPLICATION ENVIRONMENT

CROSS-REFERENCE TO RELATED APPLICATION

This application claims the benefit of U.S. Provisional Application No. 61/677,889 filed on Jul. 31, 2012 by Cristiano da Silva Marcolin, et al., the entire disclosure of which is incorporated by reference herein.

BACKGROUND

Oilfield operations, such as surveying, drilling, wireline testing, completions, production, planning and oilfield analysis, may be performed to locate and gather valuable downhole fluids. During the oilfield operations, data is collected for analysis and/or monitoring of the oilfield operations. Such data may include, for example, subterranean formation, equipment, historical and/or other data. Data concerning the subterranean formation is collected using a variety of sources, and may be static or dynamic. Static data relates to, for example, formation structure, and geological stratigraphy that define the geological structures of the subterranean formation. Dynamic data relates to, for example, fluids flowing through the geologic structures of the subterranean formation over time. Such static and/or dynamic data may be collected to learn more about the formations and the valuable assets contained therein.

Sources used to collect static data may be seismic tools, such as a seismic truck that sends compression waves into the earth. Signals from these waves are processed and interpreted to characterize changes in the anisotropic and/or elastic properties, such as velocity and density, of the geological formation at various depths. This information may be used to generate basic structural maps of the subterranean formation. Other static measurements may be gathered using downhole measurements, such as core sampling and well logging techniques. Core samples may be used to take physical specimens of the formation at various depths. Well logging involves deployment of a downhole tool into the wellbore to collect various downhole measurements, such as density, resistivity, etc., at various depths. Such well logging may be performed using, for example, a drilling tool and/or a wireline tool. Once the well is formed and completed, fluid flows to the surface using production tubing and other completion equipment. As fluid passes to the surface, various dynamic measurements, such as fluid flow rates, pressure, and composition may be monitored. These parameters may be used to determine various characteristics of the subterranean formation.

Sensors may be positioned about an oilfield to collect data relating to various oilfield operations. For example, sensors in the drilling equipment may monitor drilling conditions, sensors in the wellbore may monitor fluid composition, sensors located along the flow path may monitor flow rates, and sensors at the processing facility may monitor fluids collected. Other sensors may be provided to monitor downhole, surface, equipment or other conditions. Such conditions may relate to the type of equipment at the wellsite, the operating setup, formation parameters, or other variables of the oilfield. The monitored data is often used to make decisions at various locations of the oilfield at various times. Data collected by these sensors may be further analyzed and processed. Data may be collected and used for current or future operations. When used for future operations at the same or other locations, such data may sometimes be referred to as historical data.

The data may be used to predict downhole conditions, and make decisions concerning oilfield operations. Such decisions may involve well planning, well targeting, well completions, operating levels, production rates and other operations and/or operating parameters. Often this information is used to determine when to drill new wells, re-complete existing wells, or alter wellbore production. Oilfield conditions, such as geological, geophysical and reservoir engineering characteristics may have an impact on oilfield operations, such as risk analysis, economic valuation, and mechanical considerations for the production of subsurface reservoirs.

Data from one or more wellbores may also be analyzed to plan or predict various outcomes at a given wellbore. In some cases, the data from neighboring wellbores or wellbores with similar conditions or equipment may be used to predict how a well will perform. A large number of variables and large quantities of data may be used to consider in analyzing oilfield operations. It is, therefore, often useful to model the behavior of the oilfield operation to determine the desired course of action. During the ongoing operations, the operating conditions may need adjustment as conditions change and new information is received.

Techniques have been developed to model the behavior of various aspects of the oilfield operations, such as geological structures, downhole reservoirs, wellbores, surface facilities as well as other portions of the oilfield operation, and there are different types of simulators for different purposes. For example, there are simulators that focus on reservoir properties, wellbore production, or surface processing. Furthermore, attempts have been made to consider a broader range of data in oilfield operations and couple together different types of simulators.

Despite the development and advancement of managing oilfield data for oilfield operations, a need continues to exist for techniques for facilitating workflow collaboration and data sharing between multiple individuals. The amount of oil field data, or exploration and production data, available to exploration geoscientists and Exploration and Production (E&P) professionals is enormous. Exploration and production data is often stored in unstructured databases, resulting in inefficient management of exploration and production data and difficulty for users in locating relevant exploration and production data to their particular projects and tasks.

One specific difficulty encountered by many users, for example, relates to the management of reference datums for time domain data such as well and seismic data. A reference datum is an agreed and known value, such as the elevation of a benchmark or sea level, to which other measurements are corrected. In seismic data, the term refers to an arbitrary planar surface to which corrections are made and on which sources and receivers are assumed to lie to minimize the effects of topography and near-surface zones of low velocity.

One specific reference data is referred to as a seismic reference datum (SRD), which corresponds to the depth where seismic time is zero. For marine acquisitions, the SRD may be set to zero, based essentially on the mean sea level (MSL) location of the senders and receivers for the survey. However, for land acquisitions, each seismic survey may have a different SRD based upon the depth of the senders and receivers relative to MSL.

Conventional collaborative E&P environments, such as collaborative petro-technical application environments, may associate each project with a single SRD to establish a single reference for the time domain for the project. However, with increased sharing of data between multiple users, an increased likelihood exists that different seismic and other time domain data may be related yet have different SRD values. As a result, when time domain data needs to be added to a shared repository or project, the data is converted for the SRD associated with the project. In some instances, this may require that the data be manually exported, transformed, and then reimported prior to adding the data to a shared project, all of which may be time-intensive operations.

Therefore, a substantial need continues to exist in the art for an improved manner of managing time domain data in a collaborative petro-technical application environment.

SUMMARY

The embodiments disclosed herein provide a method, apparatus, and program product that facilitate the management of time domain data in a collaborative petro-technical application environment by associating time domain data in a shared project or repository with a data-specific SRD value. By doing so, when the time domain data is retrieved into a local project or client application for a particular user, the SRD for the time domain data and the SRD for the local project or client application may be used to facilitate conversion of the time domain data for use with the SRD for the local project or client application.

Therefore, consistent with one aspect of the invention, time domain data may be maintained in a collaborative petro-technical application environment by storing first data in a shared project of a petro-technical collaboration application, including tagging the first data with a first seismic reference datum (SRD) for the first data, and storing second data in the shared project, including tagging the second data with a second SRD for the second data that is different from the first SRD.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 2A-2D illustrate simplified, schematic views of an oilfield having subterranean formations containing reservoirs therein in accordance with implementations of various technologies and techniques described herein.

DETAILED DESCRIPTION

The herein-described embodiments provide a method, apparatus, and program product that facilitate the management of time domain data in a collaborative petro-technical application environment by associating time domain data in a shared project or repository with a data-specific SRD value. By doing so, when the time domain data is retrieved into a local project or client application for a particular user, the SRD for the time domain data and the SRD for the local project or client application may be used to facilitate conversion of the time domain data for use with the SRD for the local project or client application.

Other variations and modifications will be apparent to one of ordinary skill in the art.

Hardware and Software Environment

Figure 1:
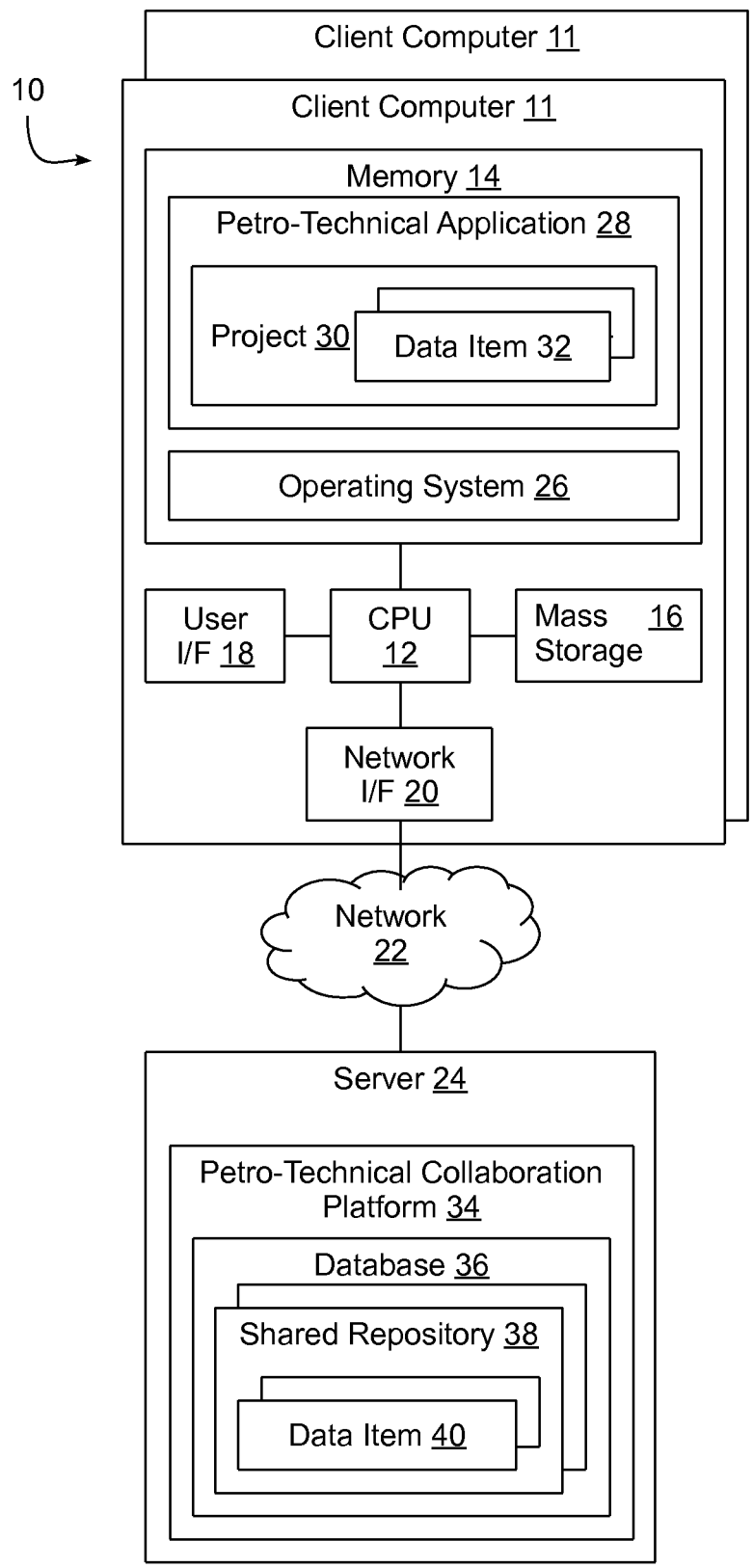
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 11, e.g., client computers, each including a central processing unit 12 including at least one hardware-based microprocessor coupled to a memory 14, which may represent the random access memory (RAM) devices comprising the main storage of a computer 11, as well as any supplemental levels of memory, e.g., cache memories, non-volatile or backup memories (e.g., programmable or flash memories), read-only memories, etc. In addition, memory 14 may be considered to include memory storage physically located elsewhere in a computer 11, e.g., any cache memory in a microprocessor, as well as any storage capacity used as a virtual memory, e.g., as stored on a mass storage device 16 or on another computer coupled to a computer 11.

Each computer 11 also receives a number of inputs and outputs for communicating information externally. For interface with a user or operator, a computer 11 may include a user interface 18 incorporating one or more user input devices, e.g., a keyboard, a pointing device, a display, a printer, etc. Otherwise, user input may be received, e.g., over a network interface 20 coupled to a network 22, from one or more servers 24. A computer 11 also may be in communication with one or more mass storage devices 16, which may be, for example, internal hard disk storage devices, external hard disk storage devices, storage area network devices, etc.

A computer 11 may operate under the control of an operating system 26 and executes or otherwise relies upon various computer software applications, components, programs, objects, modules, data structures, etc. For example, a petro-technical application 28 may be used to manage one or more local projects 30, and for which one or more data items 32 may be stored. Application 28 may interface with a petro-technical collaboration platform 34, which may include a database 36 within which may be stored one or more shared repositories or projects 38, and with which may be stored one or more data items 40. Collaboration platform 34 and/or database 36 may be implemented using multiple servers 24 in some implementations, and it will be appreciated that each server 24 may incorporate processors, memory, and other hardware components similar to a client computer 11. In addition, in some implementations platform 34 may be implemented within a database.

In one non-limiting embodiment, for example, petro-technical application 28 may be implemented as a desktop application compatible with the PETREL Exploration & Production (E&P) software platform, while petro-technical collaboration platform 34 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other petro-technical applications, so the invention is not limited to the particular software platforms and environments discussed herein.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code may comprise one or more instructions that are resident at various times in various memory and storage devices in a computer, and that, when read and executed by one or more processors in a computer, cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

FIGS. 2a-2d illustrate simplified, schematic views of an oilfield 100 having subterranean formation 102 containing reservoir 104 therein in accordance with implementations of various technologies and techniques described herein. FIG. 2a illustrates a survey operation being performed by a survey tool, such as seismic truck 106.1, to measure properties of the subterranean formation. The survey operation is a seismic survey operation for producing sound vibrations. In FIG. 2a, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 2b illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

The wellbore may be drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 2c illustrates a wireline operation being performed by wireline tool 106.3 suspended by rig 128 and into wellbore 136 of FIG. 2b. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2a. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 2d illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2b-2d illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2a-2d are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
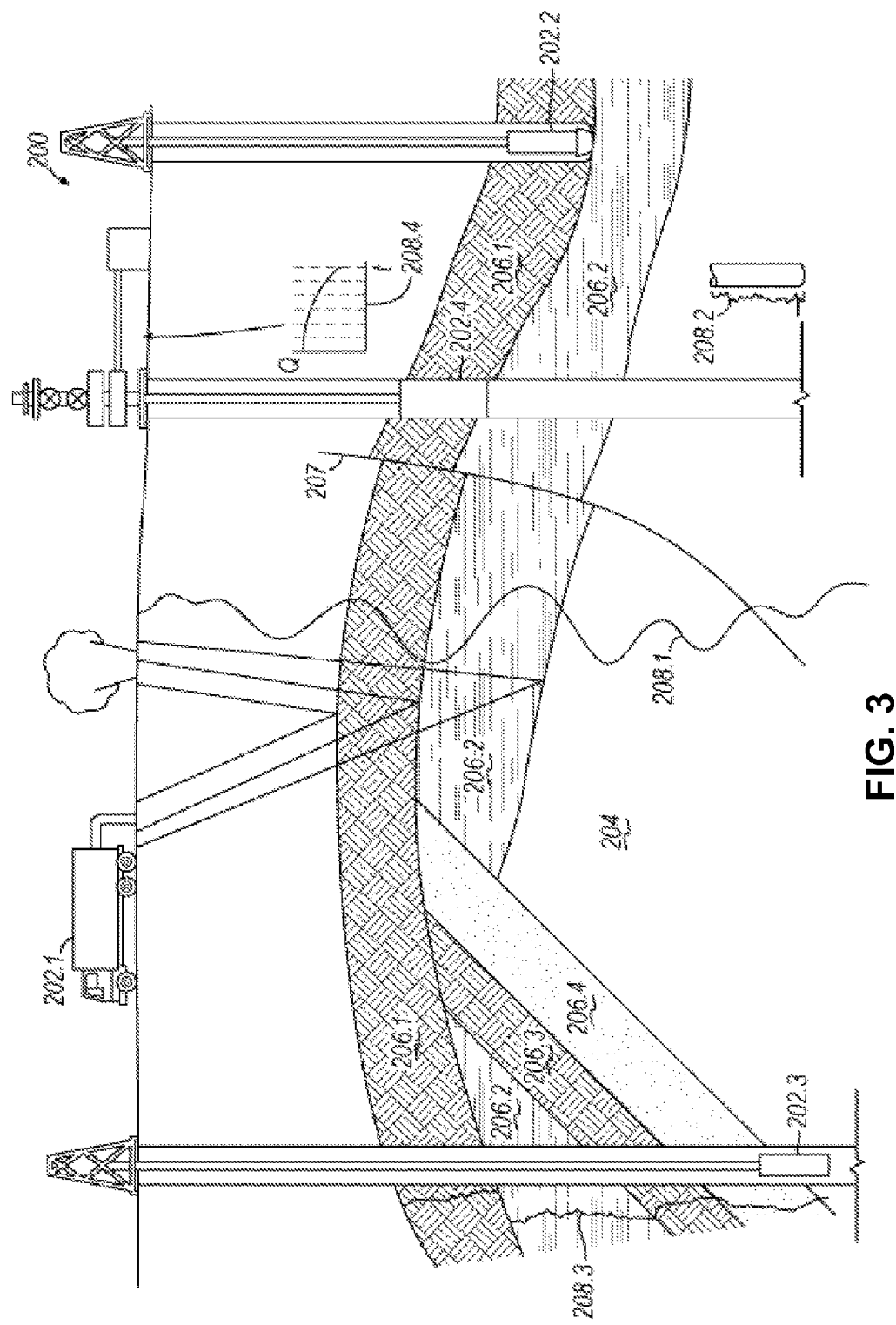
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2a-2d, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that provides a resistivity or other measurement of the formation at various depths.

A production decline curve or graph 208.4 is a dynamic data plot of the fluid flow rate over time. The production decline curve provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, e.g., below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Seismic data displayed in static data plot 208.1 from data acquisition tool 202.1 may be used by a geophysicist to determine characteristics of the subterranean formations and features. The core data shown in static plot 208.2 and/or log data from well log 208.3 may be used by a geologist to determine various characteristics of the subterranean formation. The production data from graph 208.4 may be used by the reservoir engineer to determine fluid flow reservoir characteristics. The data analyzed by the geologist, geophysicist and the reservoir engineer may be analyzed using modeling techniques.

Figure 4:
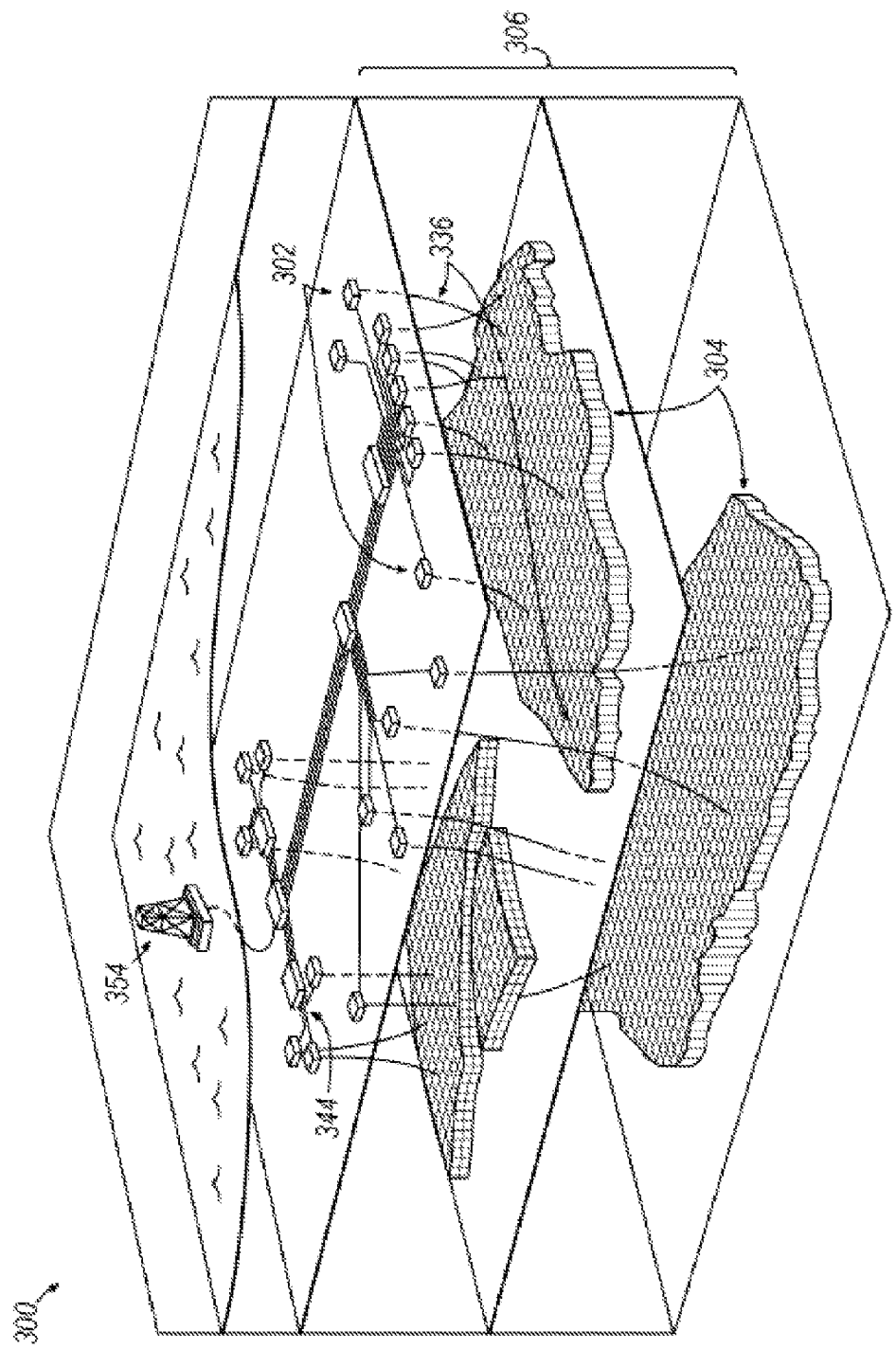
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Modeling and Manipulation of Seismic Reference Datum (SRD) in a Collaborative Petro-Technical Application Environment In many E&P environments, on seismic acquisitions computations are corrected to the Seismic reference datum (SRD), corresponding to the depth were seismic time is equal to Zero. For marine acquisitions the SRD is normally set to Zero, but for land acquisitions each seismic survey can have a different SRD.

Figure 5:
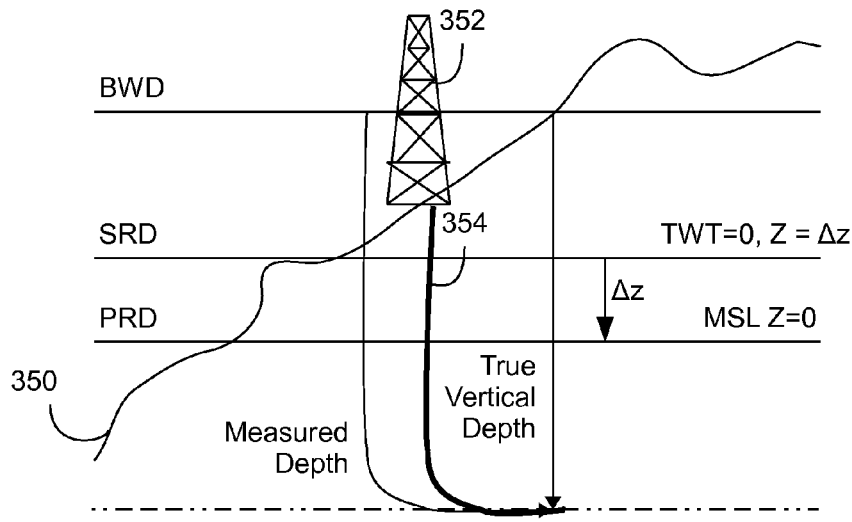
FIG. 5 is a block diagram illustrating various reference datums used in association with time domain data.

As shown in FIG. 5, for example, a site 350 may have a drilling rig 352 and well bore 354 at various elevations or depths relative to mean sea level (MSL). A Project Reference Datum (PRD) is generally defined at MSL, and is generally the datum from which other elevation references are measured. A Borehole Working Datum (BWD) is generally from which borehole depth values are measured, and is generally the reference point for log curves, depth-indexed markers and deviation surveys. The BWD generally is set at the Kelly bushing on drilling rig 352. The SRD is the datum from which two-way time (TWT) depth values are measured, and applies, for example, to seismic or horizon data in a seismic application, time grid data, and borehole-related data such as TWT markers and seismic time pick markers.

Generally, each project in conventional E&P environments and petro-technical applications has just one SRD to establish a common reference for the time domain for all of the data in the project. Conventional collaborative environments also maintain this requirement, which has been found to complicate the sharing of time domain data with different SRD values.

Embodiments consistent with the invention, on the other hand, address these difficulties by omitting SRD tagging at the shared project level in a collaborative petro-technical application and tagging data with data-specific SRD values. Generally, however, petro-technical client applications retain local project level SRD tagging, and conversion is performed as needed whenever time domain data is downloaded from a shared project to a local project. Otherwise, in instances where no local projects are used, conversion may also be performed to support whatever SRD is being used by a client application to which the data is being downloaded.

In the illustrated embodiment described hereinafter, a collaborative petro-technical application environment including, on the client side, a petro-technical client application compatible with the PETREL Exploration & Production (E&P) software platform, and on the server side, a petro-technical collaboration application compatible with the STUDIO E&P KNOWLEDGE ENVIRONMENT platform. A collaborative petro-technical application environment may be considered to include any number of application environments in which oilfield data and other data relevant to the oil & gas industry may be stored and accessed to and from one or more shared repositories (also referred to as shared projects), e.g., for performing various business operations such as data analysis, simulation, modeling, planning, forecasting, visualization, seismic interpretation, velocity modeling, depth conversion, well design, well correlation, etc. Furthermore, in the illustrated embodiment, the shared repositories may be shared by multiple individuals, including individuals with different responsibilities, different technical backgrounds, and different levels of expertise, and for different purposes. Moreover, such individuals may find, from time to time, that certain oilfield data may be generated, stored, deleted, updated and/or modified by other individuals, and that such oilfield data may be of interest to such individuals in the performance of their duties. In addition, certain oilfield data may be time domain data (e.g., seismic data (including 2D/3D cubes), horizons interpretation, fault interpretations, checkshots, time logs, well tops, surfaces, polygons, markers, point sets, etc.) that is correlated to a particular reference datum such as an SRD, and that different time domain data may have different SRD's, yet may desirably be stored in the same shared repository.

Figure 6:
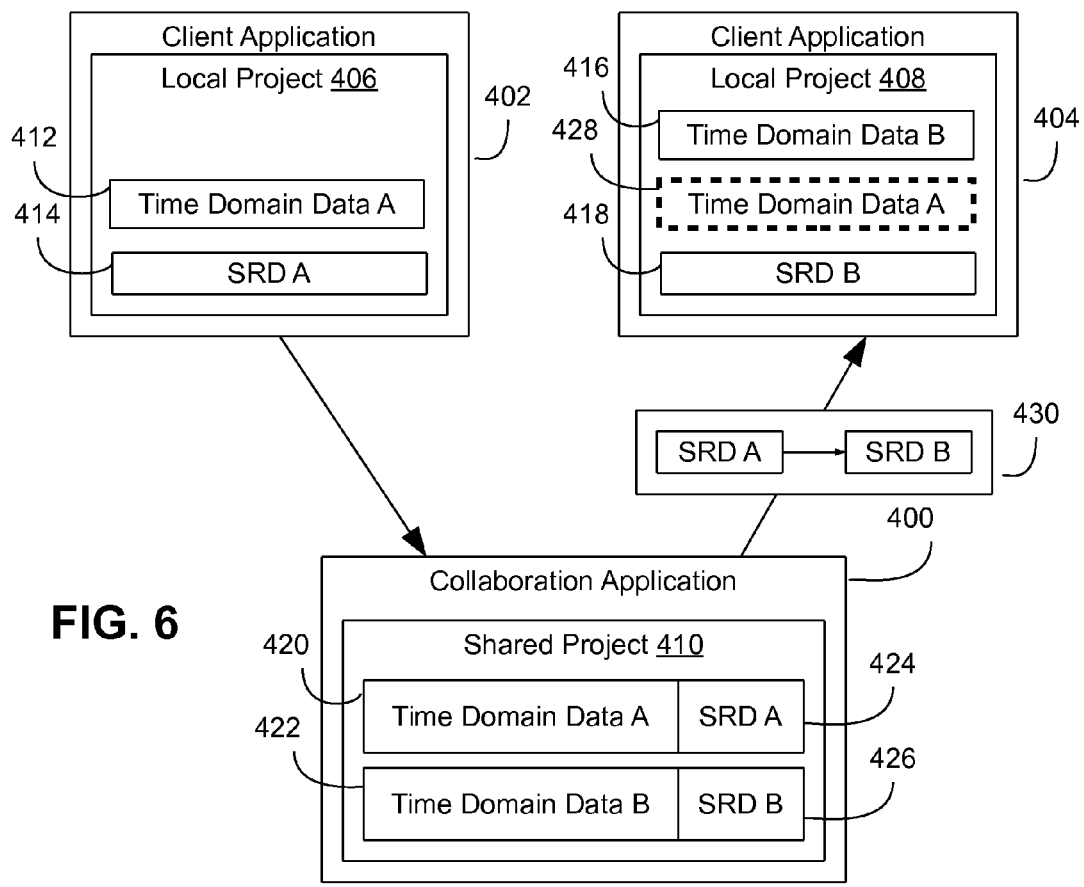
FIG. 6 is a block diagram illustrating the import and export of time domain data in a collaborative E&P environment in accordance with implementations of various technologies and techniques described herein.

For example, as shown in FIG. 6, a collaborative petro-technical application environment may include a collaboration application 400 interfaced with a plurality of client applications 402, 404. In some embodiments, collaboration application 400 may be implemented within a server and database environment, e.g., in server 24 of FIG. 1. In this environment, the client and collaboration applications both utilize projects, where a project in the client application (e.g., local projects 406, 408) is the project the user works with and a project in the collaboration application (e.g., shared project 410) is the project where the user pushes or uploads data for collaboration with other users. In the illustrated embodiment, local projects 406, 408 retain project level SRD tagging such that all time domain data loaded into a local project shares the same SRD; however, time domain data in the shared project 410 is separately tagged with a data-specific SRD.

Thus, for example, as shown in FIG. 6, certain time domain data 412 (also designated as time domain data A) is stored in local project 406, and local project 406 is tagged at the project level with a single SRD 414 (SRD A). Likewise, for local project 408, certain time domain data 416 (also designated as time domain data B) is stored in local project 408, and local project 408 is tagged at the project level with a single SRD 418 (SRD B).

Assuming, for example, that the users of both client applications 402, 404 upload or share their respective time domain data 412, 416 with collaboration application 400, the respective time domain data 420, 422 (corresponding respectively to time domain data A in local project 406 and time domain data B in local project 408) is stored in shared project 410, but is tagged at the data level with the SRD's associated with the respective local projects 406, 408, illustrated at 424 and 426 and corresponding respectively to SRD A for local project 406 and SRD B for local project 408.

The manner in which time domain data may be tagged with an SRD may vary in different embodiments. Data may be organized into items, objects or other data structures, and includes fields or parameters that include the associated SRD. Data items/objects/data structures etc. may also be grouped together into sub-projects or other collections, and associated with a common SRD. SRD's may be stored in separate tables or other data structures and linked or otherwise associated with certain time domain data. Other variations will be apparent to one of ordinary skill in the art having the benefit of the instant disclosure.

In addition, in the illustrated embodiment, when retrieving time domain data from collaboration application 400 into a client application 402, 404, data conversion may be used to convert the SRD for the time domain data based upon the SRD of the local project into which the data is being retrieved. For example, if it is desired to retrieve time domain data A into local project 408 of client application 404 (represented at 428 in FIG. 6), a conversion from SRD A to SRD B (the SRD for local project 408) may be performed at 430 prior to storing the data in the local project. As will become more apparent below, the conversion may be automatic or manual in different embodiments.

Figure 7:
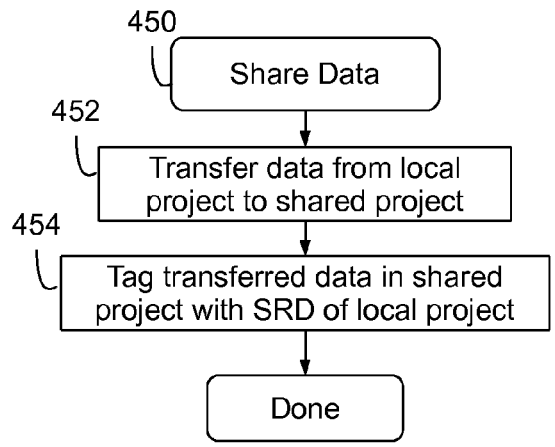
FIG. 7 is a flowchart illustrating a sequence of operations performed by a share data routine in accordance with implementations of various technologies and techniques described herein.

Now turning to FIG. 7, a share data routine 450, which is performed whenever time domain data is shared from a local project into a shared project, begins in block 452 by transferring the time domain data being shared from the local project to the shared project. Then, as shown in block 454, the time domain data is automatically tagged in the shared project with the SRD of the local project, and routine 450 is complete. It will be appreciated that tagging may include any operation that assigns or otherwise associates the time domain data with the SRD of the local project.

Figure 8:
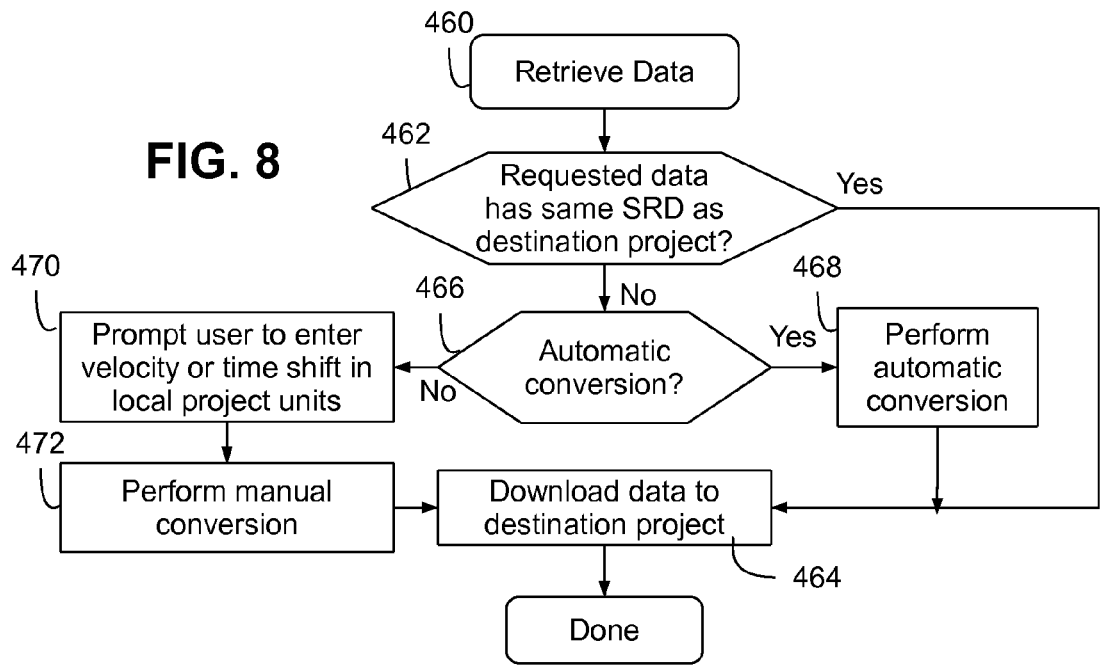
FIG. 8 is a flowchart illustrating a sequence of operations performed by a retrieve data routine in accordance with implementations of various technologies and techniques described herein.

For the converse operation of retrieving time domain data from a shared project into a local project, FIG. 8 illustrates a retrieve data routine 460 that begins in block 462 by determining whether the requested time domain data has the same SRD as the destination local project, e.g., by comparing the SRD for the local project with the tagged SRD for the time domain data in the shared project.

If the SRD's are the same, control passes to block 464 to download the requested data to the destination local project, and routine 460 is complete. Otherwise, control passes to block 466 to determine whether automatic conversion should be performed. Block 466 may be based, for example, on a user setting, an administrator setting, or other factors such as whether certain data is capable of being converted without user assistance. For example, in the case of retrieving time log data a transformation may be possible using the time and depth information of the log, so automatic conversion without user input may be permitted. Automated conversion may also be performed for other types of data, e.g., using velocity models.

Thus, if automatic conversion is possible, control passes to block 468 to perform the automatic conversion, and then to block 464 to download the (now converted) data to the destination local project, and routine 460 is complete. Otherwise, if manual conversion is needed, block 466 passes control to block 470 to prompt the user (e.g., in a dialog box or other user interface control) to specify a conversion parameter such as a velocity (e.g., in m/s or ft/s) or time shift (e.g., in ms) to convert the data between the SRD of the data and the SRD of the destination local project. Block 472 then performs a manual conversion using the conversion parameter input by the user in block 470, and control then passes to block 464 to download the (now converted) data to the destination local project, and routine 460 is complete.

It will be appreciated that conversion of time domain data between two SRD's would be within the abilities of one of ordinary skill in the art having the benefit of the instant disclosure. It will also be appreciated that in some embodiments, no automatic conversion may be supported, while in other embodiments no manual conversion may be used. In addition, it will be appreciated that tagging time domain data with an SRD and/or manually or automatically converting time domain data between SRD's may be performed by a client application or a collaborative application either prior or subsequent to transferring the data between the applications in different embodiments of the invention. Furthermore, in some embodiments, no local projects may be used, and data may be maintained solely in shared projects.

In some embodiments, automatic conversion may be performed based on the available data. For example, if an average velocity is known, the difference between an SRD and a PRD may be used to perform a timeshift. Furthermore, even if an average velocity is not known, a checkshot or other depth vs. time log curve may be used to perform a timeshift, with extrapolation used as needed. Velocity model automatic conversion may also be used for other data types that are not checkshot and time logs.

While particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method of maintaining time domain data in a collaborative petro-technical application environment, the method comprising:
    receiving seismic data representing a subterranean formation and collected using one or more seismic receivers;
    storing first data based on the seismic data in a first local project, the first data referencing a first seismic reference datum (SRD) in the first local project from which travel time is calculated in the first data;
    storing second data based on the seismic data in a second local project, the second data referencing a second SRD in the second local project from which travel time is calculated in the second data, the first and second SRDs being at different depths;
    maintaining a shared project in a petro-technical collaboration application;
    transferring the first data from the first local project to the shared project, wherein the first data is tagged as referencing the first SRD in the shared project;
    transferring the second data from the second local project to the shared project, wherein the second data is tagged as referencing the second SRD in the shared project; and
    transferring the first data from the shared project into the second local project, wherein transferring the first data from the shared project into the second local project comprises determining, using a processor, that the first data references a different SRD from the second SRD in the second local project and in response to determining that the first data references the different SRD converting, using the processor, the first data such that the first data references the second SRD.

2. The method of claim 1, further comprising receiving the first data from a first petro-technical client application and receiving the second data from a second petro-technical client application.

3. The method of claim 2, wherein the first data is associated with the first local project of the first petro-technical client application and wherein the second data is associated with the second local project of the second petro-technical client application.

4. The method of claim 3, wherein the second local project is associated with the second SRD that is different from the first SRD, and wherein converting the first data comprises converting the first data for use with the second SRD such that the converted first data is used by the second local project.

5. The method of claim 1, wherein converting the first data includes automatically converting the time domain data.

6. The method of claim 5, further comprising determining whether to automatically convert the first data.

7. The method of claim 1, wherein converting the first data includes:
    prompting a user for input of a conversion parameter; and
    manually converting the first data using the conversion parameter.

8. The method of claim 7, wherein the conversion parameter is a time shift or a velocity.

9. The method of claim 1, further comprising comparing the first SRD with which the first data is tagged in the shared project with the second SRD to determine whether conversion of the first data is needed.

10. The method of claim 1, wherein the first SRD is a local project-level SRD as opposed to a shared project-level SRD.

11. An apparatus, comprising:
    at least one processor; and
    a memory system comprising one or more non-transitory, computer-readable media storing instructions that, upon execution by the at least one processor, cause the apparatus to perform operations to share time domain data in a collaborative petro-technical application environment, the operations comprising:
        receiving seismic data representing a subterranean formation and collected using one or more seismic receivers;
        storing first data based on the seismic data in a first local project, the first data referencing a first seismic reference datum (SRD) in the first local project from which travel time is calculated in the first data;

storing second data based on the seismic data in a second local project, the second data referencing a second SRD in the second local project from which travel time is calculated in the second data, the first and second SRDs being a different depths;

maintaining a shared project in a petro-technical collaboration application;

transferring the first data from the first local project to the shared project, wherein the first data is tagged as referencing the first SRD in the shared project;

transferring the second data from the second local project to the shared project, wherein the second data is tagged as referencing the second SRD in the shared project; and transferring the first data from the shared project into the second project, wherein transferring the first data from the shared project into the second project comprises determining, using a processor, that the first data references a different SRD from the second SRD in the second local project and in response to determining that the first data references the different SRD converting, using the processor, the first data such that the first data references the second SRD.

12. The apparatus of claim 11, wherein the operations further comprise:

receiving the first data from a first petro-technical client application; and receiving the second data from a second petro-technical client application, wherein the first data is associated with the first local project of the first petro-technical client application and wherein the second data is associated with the second local project of the second petro-technical client application.

13. The apparatus of claim 12, wherein the second local project is associated with the second SRD that is different from the first SRD, and wherein converting the first data comprises converting the first data for use with the second SRD such that the converted first data is used by the second local project.

14. The apparatus of claim 11, wherein converting includes automatically converting the first data.

15. The apparatus of claim 11, wherein converting comprises:

prompting a user for input of a conversion parameter; and manually converting the first data using the conversion parameter.

16. The apparatus of claim 15, wherein the conversion parameter is a time shift or a velocity.

17. A program product, comprising:

a non-transitory computer readable medium; and program code stored on the computer readable medium and configured upon execution by at least one processor to share time domain data in a collaborative petro-technical application environment by:

receiving seismic data representing a subterranean formation and collected using one or more seismic receivers;

storing first data based on the seismic data in a first local project, the first data referencing a first seismic reference datum (SRD) in the first local project from which travel time is calculated in the first data;

storing second data based on the seismic data in a second local project, the second data referencing a second SRD in the second local project from which travel time is calculated in the second data, the first and second SRDs being at different depths;

maintaining a shared project in a petro-technical collaboration application;

transferring the first data from the first local project to the shared project, wherein the first data is tagged as referencing the first SRD in the shared project;

transferring the second data from the second local project to the shared project, wherein the second data is tagged as referencing the second SRD in the shared project; and transferring the first data from the shared project into the second project, wherein transferring the data from the shared project into the second project comprises determining, using a processor, that the first data references a different SRD from the second SRD in the second local project and in response to determining that the first data references the different SRD converting, using the processor, the first data such that the first data references the second SRD.

* * * * *